US012176611B2

(12) United States Patent
Ribeiro et al.

(10) Patent No.: US 12,176,611 B2
(45) Date of Patent: Dec. 24, 2024

(54) SMALL CELL ACCESS NODE AND ANTENNA SUPPORT BRACKET FOR USE THEREIN

(71) Applicant: UBICQUIA, INC., Fort Lauderdale, FL (US)

(72) Inventors: Claudio Santiago Ribeiro, Evanston, IL (US); Cesar Eduardo Nunez, Miramar, FL (US)

( * ) Notice: Subject to any disclaimer, the term of this patent is extended or adjusted under 35 U.S.C. 154(b) by 281 days.

(21) Appl. No.: 17/566,653

(22) Filed: Dec. 30, 2021

(65) Prior Publication Data

US 2023/0216204 A1 Jul. 6, 2023

(51) Int. Cl.
*H04B 1/38* (2015.01)
*H01Q 1/24* (2006.01)
*H01Q 13/06* (2006.01)

(52) U.S. Cl.
CPC ........... *H01Q 13/065* (2013.01); *H01Q 1/246* (2013.01)

(58) Field of Classification Search
CPC ........ H01Q 13/065; H01Q 1/246; H01Q 1/12; H04M 1/026; H04M 1/0274
See application file for complete search history.

(56) References Cited

U.S. PATENT DOCUMENTS 5,988,583 A * 11/1999 Rhine ...................... H01Q 1/12 248/539
2007/0176841 A1 8/2007 Kamada et al.
2019/0051974 A1 2/2019 Schlosser
2021/0226316 A1 7/2021 Migliorino et al.
2021/0249762 A1* 8/2021 Severin .................... H01Q 1/42

OTHER PUBLICATIONS

U.S. Patent & Trademark Office as International Searching Authority, International Search Report issued in connection with counterpart International Application No. PCT/US22/54132, Apr. 25, 2023, 2 pages.

U.S. Patent & Trademark Office as International Searching Authority, Written Opinion of the International Searching Authority issued in connection with counterpart International Application No. PCT/US22/54132, Apr. 25, 2023, 7 pages.

* cited by examiner

*Primary Examiner* — Tuan Pham
(74) *Attorney, Agent, or Firm* — Daniel C. Crilly; Scott Garrett

(57) ABSTRACT

A small cell includes a housing and an antenna support bracket mountable within the housing. The bracket includes a base member and a flange member. The base member supports a substrate of an antenna. The flange member is positioned along a first edge of the base member and extends away from the base member in a first direction. The flange member includes at least one generally hook-shaped arm member configured to engage a hook receiving element integrated with or attached to a sidewall of the small cell housing. The antenna support bracket may further include a second flange member positioned along a second edge of the base member and extending in a second direction opposite to the first direction. A non-conductive spacer may be adhered to a surface of the second flange member to provide electrical isolation between an electrically conductive fastener and the surface of the second flange member.

20 Claims, 14 Drawing Sheets

SMALL CELL ACCESS NODE AND ANTENNA SUPPORT BRACKET FOR USE THEREIN

TECHNICAL FIELD

The present disclosure relates generally to antenna assemblies for wireless networking devices, and, more particularly, relates to an antenna assembly for a small cell access node which optimizes horizontal reception while reducing coupling of a transmitted signal into the circuitry of the small cell access node.

BACKGROUND

Wireless communication is in common use, with a rapidly increasing number of deployed devices that need access. In particular, as people use their mobile devices more for data services than voice calls, there is an increasing need for data access. Given that there is a limitation on available radio bandwidth for such services, service provides are scaling down service areas so that spectrum allocation can be repeated in smaller cells. This means that rather than using towers that cover conventional cell regions under prior systems, new systems will use small cells that are more like wireless local area networks than traditional cellular communications. As a result, small cell access nodes will be deployed in much higher numbers that traditional cellular base stations.

One of the challenges for small cell access nodes is antenna configuration. It is preferred that such devices are designed to be as unobtrusive and unnoticeable as possible. One way to accomplish this is by use of internal, hidden antenna elements. It is also important to reduce the effect of a transmitting signal on the circuitry of the device.

SUMMARY

In accordance with some exemplary embodiments of the present disclosure, there is provided an antenna support bracket mountable within a housing of a small cell access node. The antenna support bracket includes a substantially planar base member sized and shaped to support a substantially planar substrate of an antenna. The antenna support bracket further includes a flange member positioned along a first edge of the base member. The flange member extends away from the base member in a first direction. The flange member includes at least one generally hook-shaped arm member configured to engage a hook receiving element integrated with or attached to a sidewall of the small cell access node housing. According to one exemplary embodiment, the base member may have a surface area in a range of about 50 square centimeters to 100 square centimeters on a surface of the base member that supports the antenna substrate.

According to another exemplary embodiment, the antenna support bracket may further include a strain relief clip secured to the base member and configured to receive and provide strain relief to at least part of a coaxial cable. The coaxial cable is soldered to solder pads on the substrate of the antenna and extends past a second edge of the base member when the antenna substrate is installed on the base member.

According to yet another exemplary embodiment, the antenna support bracket may further include a second flange member positioned along a second edge of the base member and extending away from the base member in a second direction that is generally opposite to the first direction. In such a case, the second flange member may have a first surface and an opposing second surface separated by a thickness. Additionally, the antenna support bracket may further include a non-conductive spacer adhered to the second surface of the second flange member, with the spacer providing electrical isolation for the second flange member.

According to a further exemplary embodiment in which the antenna support bracket includes the second flange member and the second flange member defines an aperture sized and shaped to receive an electrically conductive fastener, the antenna support bracket may further include a second non-conductive spacer adhered to the first surface of the second flange member about the aperture. In this case, the second spacer provides electrical isolation between the electrically conductive fastener and the first surface of the second flange member.

According to another exemplary embodiment in which the antenna support bracket includes the second flange member and the second flange member defines an aperture sized and shaped to receive an electrically conductive fastener, the antenna support bracket may further include a one-piece, non-conductive spacer clip that includes a first spacer element positioned on at least part of the second surface of the second flange member, a second spacer element positioned on the first surface of the second flange member proximate the aperture, and a third spacer element that interconnects the first spacer element and the second spacer element and passes through the aperture. In this embodiment, the spacer clip provides electrical isolation between the second flange member and the fastener and between the second flange member and a floor member of the small cell access node housing when the antenna support bracket is installed in the small cell access node housing.

According to another exemplary embodiment, the flange member of the antenna support bracket may include a pair of spaced apart, generally hook-shaped arm members configured to engage a pair of spaced apart hook receiving elements integrated with or attached to the sidewall of the small cell access node housing.

In accordance with additional exemplary embodiments of the present disclosure, there is provided a small cell access node that includes one or more antenna support brackets. According to one such embodiment, the small cell access node includes a housing, at least one hook receiving element, an electrically conductive antenna support bracket, at least two electrically non-conductive spacers, and at least one electrically conductive fastener. The housing includes an electrically conductive floor member, an electrically non-conductive sidewall member secured to the floor member about at least part of a periphery of the floor member, and a cover member secured to the sidewall member. The cover member, the sidewall member and the floor member of the housing define an internal chamber of the housing. The at least one hook receiving element is attached to or integrated with the sidewall member of the housing and extends toward the internal chamber of the housing.

The antenna support bracket has a substantially planar base member and two flange members. The base member is sized and shaped to support a substantially planar substrate of an antenna. A first flange member is positioned along a first edge of the base member and extends in a first direction toward the sidewall member of the housing. The first flange member includes at least one generally hook-shaped arm member that engages the at least one hook receiving element. A second flange member is positioned along a second edge of the base member and extends away from the base member in a second direction that is generally opposite to the first direction. The second flange member defines at least one aperture.

A first electrically non-conductive spacer is positioned between a first surface of the second flange member of the antenna support bracket and the floor member of the housing. At least a second electrically non-conductive spacer is positioned on a second surface of the second flange member of the antenna support bracket proximate the at least one aperture. The at least one fastener passes through the at least one aperture of the second flange member of the antenna support bracket but contacts only the at least a second spacer and the floor member of the housing. The at least one fastener secures the second flange member of the antenna support bracket to the floor member of the housing while maintaining electrical isolation of the second flange member from the at least one fastener and the floor member of the housing.

According to a further exemplary embodiment, the small cell access node may also include an antenna assembly. The antenna assembly may include the substantially planar substrate of the antenna and a coaxial cable soldered to one or more solder pads on the substrate. In such a case, the substrate may be positioned against the base member of the antenna support bracket and the coaxial cable may extend past a third edge of the base member of the antenna support bracket. Optionally, the antenna support bracket may further include a strain relief clip secured to the base member of the bracket and configured to receive and provide strain relief to at least part of the coaxial cable of the antenna assembly.

According to yet another exemplary embodiment of the small cell access node, each spacer of the at least a second spacer defines a respective spacer aperture. In such a case, each fastener of the at least one fastener passes through a corresponding spacer aperture and a corresponding aperture of the second flange member of the antenna support bracket.

According to a further exemplary embodiment of the small cell access node, the first spacer and the at least a second spacer are combined into a one-piece spacer clip. Alternatively or additionally, the at least one hook receiving element may include a pair of spaced apart hook receiving elements and the first flange member of the antenna support bracket may include a pair of spaced apart, generally hook-shaped arm members that engage the pair of hook receiving elements.

In accordance with further exemplary embodiments of the present disclosure, there is provided a small cell access node that includes a plurality of antenna support brackets. According to one such embodiment, the small cell access node includes a housing, a plurality of hook receiving elements, a plurality of electrically conductive antenna support brackets, a first plurality of electrically non-conductive spacers, a second plurality of electrically non-conductive spacers, and a plurality of electrically conductive fasteners. The housing includes an electrically conductive floor member, an electrically non-conductive sidewall member secured to the floor member about at least part of a periphery of the floor member, and a cover member secured to the sidewall member. The cover member, the sidewall member and the floor member of the housing define an internal chamber of the housing. The hook receiving elements are attached to or integrated with the sidewall member of the housing and extend toward the internal chamber of the housing. The hook receiving elements are positioned at predetermined locations along the sidewall member of the housing.

Each of the antenna support brackets includes a substantially planar base member and two flange members. The base member is sized and shaped to support a substantially planar substrate of an antenna. A first flange member is positioned along a first edge of the base member and extends in a first direction toward the sidewall member of the housing. The first flange member includes at least one generally hook-shaped arm member that engages at least one respective hook receiving element of the plurality of hook receiving elements. A second flange member is positioned along a second edge of the base member and extends away from the base member in a second direction that is generally opposite to the first direction. The second flange member defines at least one aperture.

Each spacer of the first plurality of spacers is positioned between a first surface of the second flange member of a respective antenna support bracket and the floor member of the housing. Each spacer of the second plurality of spacers is positioned on a second surface of the second flange member of a respective antenna support bracket proximate the at least one aperture of the second flange member.

Each fastener of the plurality of fasteners passes through the aperture in the second flange member of an associated antenna support bracket but contacts only the spacer positioned proximate the aperture and the floor member of the housing. Each fastener secures the second flange member of the associated antenna support bracket to the floor member of the housing while maintaining electrical isolation of the second flange member from the fastener and the floor member of the housing.

According to a further exemplary embodiment, the small cell access node may also include a plurality of antenna assemblies. Each antenna assembly may include an antenna substrate and a coaxial cable soldered to one or more solder pads on the substrate. In such a case, the antenna substrate of an antenna assembly of the plurality of antenna assemblies is positioned upon the base member of an antenna support bracket of the plurality of antenna support brackets and the coaxial cable of the antenna assembly extends past a third edge of the base member of the antenna support bracket. Optionally, each antenna support bracket of the plurality of antenna support brackets may further include a strain relief clip secured to the base member of the bracket and configured to receive and provide strain relief to at least part of the coaxial cable of an antenna assembly for which the base member provides support to the antenna substrate of the antenna assembly.

According to a further exemplary embodiment, the plurality of antenna support brackets are arranged within the small cell access node housing such that a plurality of antenna substrates supported thereby permit operation of 2×2 multiple input multiple output (MIMO) wireless technology. Alternatively, the plurality of antenna support brackets may be arranged within the small cell access node housing such that a plurality of antenna substrates supported thereby permit operation of 4×4 MIMO wireless technology.

Although the present disclosure illustrates and describes an antenna assembly for a small cell node, it is, nevertheless, not intended to be limited to the details shown because various modifications and structural changes may be made therein without departing from the spirit of the disclosure and while remaining within the scope and range of equivalents of the claims. Additionally, well-known elements of the invention will not be described in detail or will be omitted so as not to obscure the relevant details of the invention.

Features that are considered characteristic of the invention are set forth in the appended claims. As required, detailed embodiments of the small cell housing are disclosed herein; however, it is to be understood that the disclosed embodiments are merely exemplary, and the housing may be embodied in various forms. Therefore, specific structural and functional details disclosed herein are not to be interpreted as limiting, but merely as a basis for the claims and as a representative basis for teaching one of ordinary skill in the art to variously employ the claimed invention in appropriately detailed structures. Further, the terms and phrases used herein are not intended to be limiting; but rather, to provide an understandable description of the disclosure. While the specification concludes with claims defining the features of the invention, it is believed that the claimed invention will be better understood from a consideration of the following description in conjunction with the drawing figures, in which like reference numerals are carried forward. The figures of the drawings are not drawn to scale.

The terminology used herein is for the purpose of describing particular embodiments only and is not intended to be limiting. The terms "a" or "an," as used herein, are defined as one or more than one. The term "plurality," as used herein, is defined as two or more than two. The term "another," as used herein, is defined as at least a second or more. The terms "including" and/or "having," as used herein, are defined as comprising (i.e., open language). The term "coupled," as used herein, is defined as connected, although not necessarily directly, and not necessarily mechanically. The term "providing" is defined herein in its broadest sense, e.g., bringing/coming into physical existence, making available, and/or supplying to someone or something, in whole or in multiple parts at once or over a period of time.

As used in this description and the appended claims, the term "small cell" or "small cell access node" refers to a low-powered radio access node or device that operates in licensed or unlicensed spectrum having a range of ten meters to a few kilometers and which may help provide wireless communication service to indoor and/or outdoor areas. Small cells or small cell access nodes may be femtocells, picocells, or microcells.

As used in this description, unless otherwise specified, azimuth or positional relationships indicated by terms such as "up", "down", "left", "right", "inside", "outside", "front", "back", "head", "tail" and so on, are azimuth or positional relationships based on the drawings, which are only to facilitate description of the embodiments of the present invention and simplify the description, but not to indicate or imply that the devices or components must have a specific azimuth, or be constructed or operated in the specific azimuth, which thus cannot be understood as a limitation to the embodiments of the present invention. Furthermore, terms such as "first", "second", "third" and so on are only used for descriptive purposes and cannot be construed as indicating or implying relative importance.

As used in this description, unless otherwise clearly defined and limited, terms such as "installed", "coupled", "connected" should be broadly interpreted, for example, it may be fixedly connected, or may be detachably connected, or integrally connected; it may be mechanically connected, or may be electrically connected; it may be directly connected or may be indirectly connected via an intermediate medium. As used herein, the terms "about" or "approximately" apply to all numeric values, whether or not explicitly indicated. These terms generally refer to a range of numbers that one of skill in the art would consider equivalent to the recited values (i.e., having the same function or result). In many instances these terms may include numbers that are rounded to the nearest significant figure. In this document, the term "longitudinal" should be understood to mean in a direction corresponding to an elongated direction of the device. Those skilled in the art can understand the specific meanings of the above-mentioned terms in the embodiments of the present disclosure according to the specific circumstances.

BRIEF DESCRIPTION OF THE DRAWINGS

The accompanying figures, where like reference numerals refer to identical or functionally similar elements throughout the separate views and which together with the detailed description below are incorporated in and form part of the specification, serve to further illustrate various embodiments and explain various principles and advantages all in accordance with the present disclosure.

DETAILED DESCRIPTION

Figure 1:
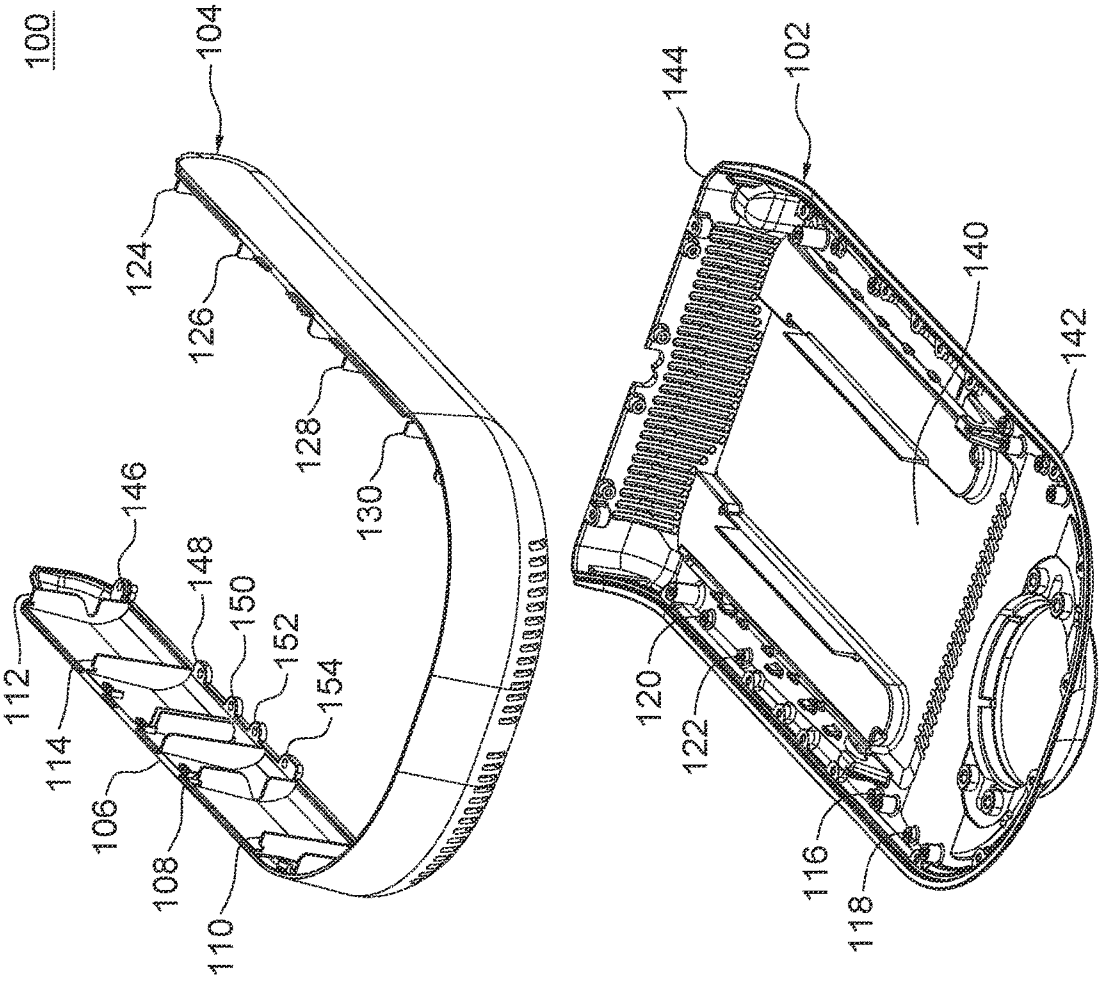
FIG. 1 shows an exploded perspective view of a partial housing assembly of a small cell access node, in accordance with some embodiments.

FIG. 1 shows an exploded perspective view of a partial housing assembly 100 of a small cell access node, in accordance with some embodiments. The housing assembly includes a lower housing member 102 and a sidewall housing member 104. The lower housing member 102 provides a floor 140 or floor member having a periphery 142 around the outside of the floor 140, which is at, or adjacent the edge of the lower housing member 102. The sidewall housing member 104 includes a sidewall 106 that extends from the periphery 142 of the lower housing member 102 in a direction generally perpendicular to a plane of the floor 140 to form a barrier (wall) around the floor 140. In some embodiment the lower housing member 102 may include a portion forming a wall such as back wall 144 at a first lengthwise end of the lower housing member 104, and the sidewall housing member can provide a wall around the remainder of the lower housing portion 102 that, in conjunction with the wall portion provided by the lower housing member 102 forms a complete wall around the periphery 142 of the lower housing member 102. The lower housing member 102 can be made of an electrically conductive material, such as aluminum, to provide a strong supporting base, while the sidewall housing member 104 can be made of a lighter, electrically insulative material, such as a polymeric material, to reduce weight of the apparatus.

On the inside of the sidewall 106 there can be several rib walls 108, 110, 112, 114, 124, 126, 128, 130. The rib walls 108, 110, 112, 114, 124, 126, 128, 130 extend inward from the inside surface of the wall 106 of the sidewall housing member 104 generally perpendicular to the inside surface of the wall 106 and are planar in a vertical direction (i.e., from bottom to top of the sidewall 106). That is, the rib walls extend inward toward the internal chamber or volume of the housing assembly. The rib walls 108, 110, 112, 114, 124, 126, 128, 130 are provided in pairs and each have a hook receiving element or hook engagement feature which, as will be explained, an antenna support bracket can hook onto to hold the antenna support brackets securely.

On the inside of the sidewall member 104 there are several screw bosses 146, 148, 150, 152, 154 which made with corresponding screw receiving bosses such as screw receiving bosses 116, 118, 120, 122. The screw bosses are disposed at various locations around the inside of the sidewall housing member 104 at the inside bottom of the sidewall housing member 104 and are used to attach the sidewall housing member 104 to the lower housing member 102. The screw receiving bosses 116, 118, 120, 122 each have bores that are threaded to receive a threaded fastener passing through the meeting screw bosses in the sidewall housing member 104.

Figure 2:
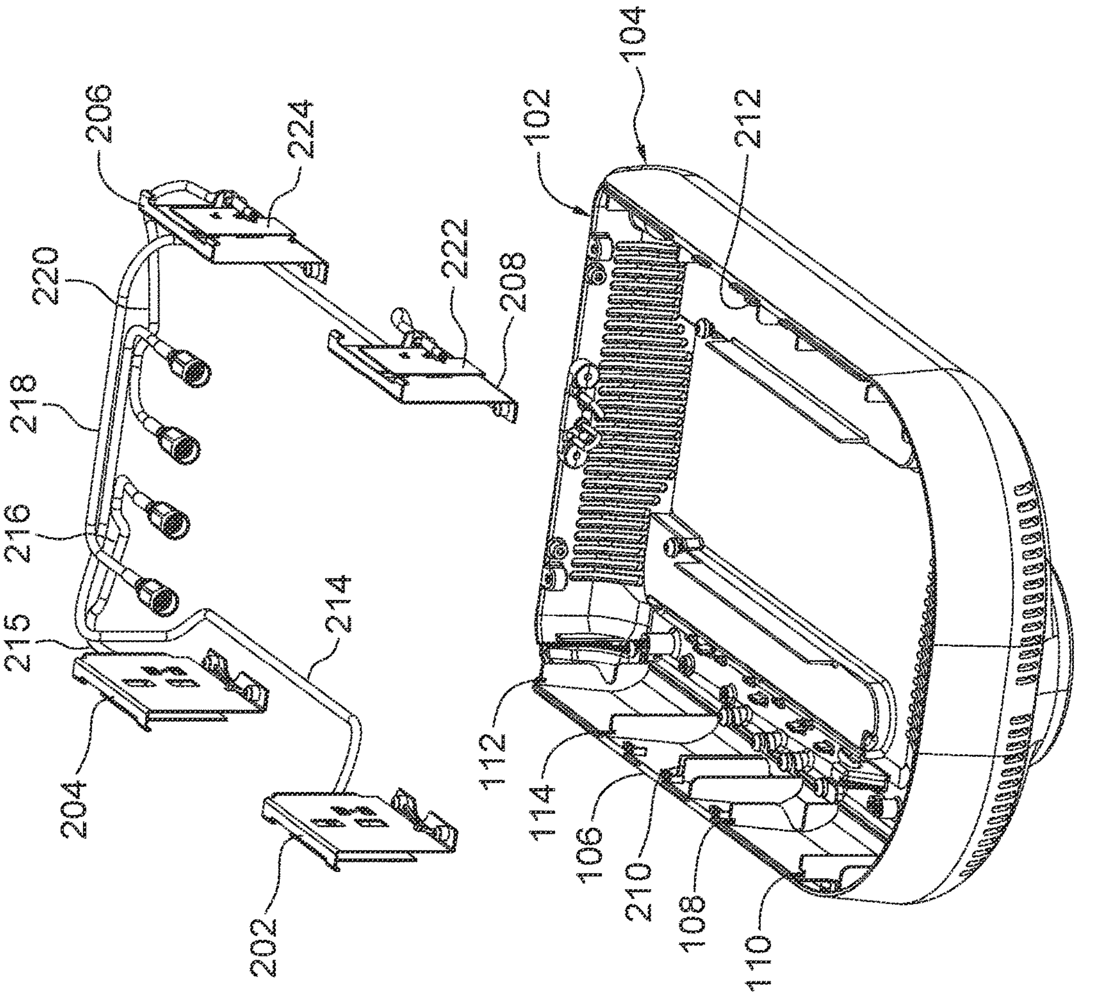
FIG. 2 shows an exploded perspective view of a partial housing assembly of a small cell access node including antenna assemblies, in accordance with some embodiments.

FIG. 2 shows an exploded perspective view of a partial housing assembly of a small cell access node including antenna assemblies, in accordance with some embodiments. In this view the sidewall housing member 104 is shown attached to the lower housing member 102. Shown separately from the housing members 102, 104 are a plurality of antenna support brackets 202, 204, 206, 208. Each of the antenna support brackets 202, 204, 206, 208 are electrically conductive and hold a vertically oriented planar antenna element on a substrate such as substrates 222, 224 mounted on antenna support brackets 208, 206, respectively. The antenna support brackets 202, 204, 206, 208 are electrically conductive and are fastened to the lower housing member 102 without making electrical contact with the lower housing member 102. The antenna support brackets 202, 204, 206, 208 are vertically oriented and hold the antenna elements likewise in a vertical orientation between the antenna support brackets 202, 204, 206, 208 and between the respective antenna support bracket 202, 204, 206, 208 and the wall 106 of the sidewall housing member 104. The antenna support brackets have hook features at their top, as will be explained herein, which engage the hook retention features on the rib walls 108, 110, 112, 114, 124, 126, 128, 130. Thus, as shown to antenna support brackets 202, 204 are disposed on a first side of the housing assembly and the other antenna support brackets 204, 208 are disposed on the opposite side of the housing assembly. Disposed between antenna support brackets 202, 204 against the inner side of wall 106 is a conductive rib wall 210, and likewise on the opposite side conductive rib wall 212 is disposed between antenna support brackets 206, 208 against the wall 106 of the sidewall housing member 104. Each of the conductive rib walls 210, 212 can be made of electrically conductive material (e.g., metal), and can be fastened to the lower housing member 102 such that there is a direct electrical connection between the lower housing member 102 and each of the conductive rib walls 210, 212. Connected to each of the antenna elements is a respective cable 215, 216, 218, 220 which can be further connected to a radio module for transmitting and receiving electromagnetic signals in accordance with a standardized radio air interface. Thus, the antenna support brackets 202, 204, 206, 208 are not electrically coupled to the lower housing member 102 directly, meaning a direct current connection. However, the antenna support brackets 202, 204, 206, 208 may be considered capacitively coupled to the lower housing member 102, above a particular frequency. The conductive rib walls 210, 212 are DC connected to the lower housing member 102. Each of the antenna support brackets 202, 204, 206, 208 have a lower flange through which fasteners pass and coupled to the lower housing member 102, and likewise with the conductive rib walls 210, 212.

To hold the antenna element substrates such as antenna element substrates 222, 224 each of the antenna support brackets 202, 204, 206, 208 can have cut out portions on their respective planar bodies folded out words to engage and hold their respective antenna element substrates. Similarly cut out portions can be folded outwards to hold cable retainers that hold ends of the cables 215, 216, 218, 220 adjacent the respective antenna element substrates. The cables 215, 216, 218, 220 are coaxial cables that are shielded and configured to conduct radio signals, as is well-known.

Figure 3:
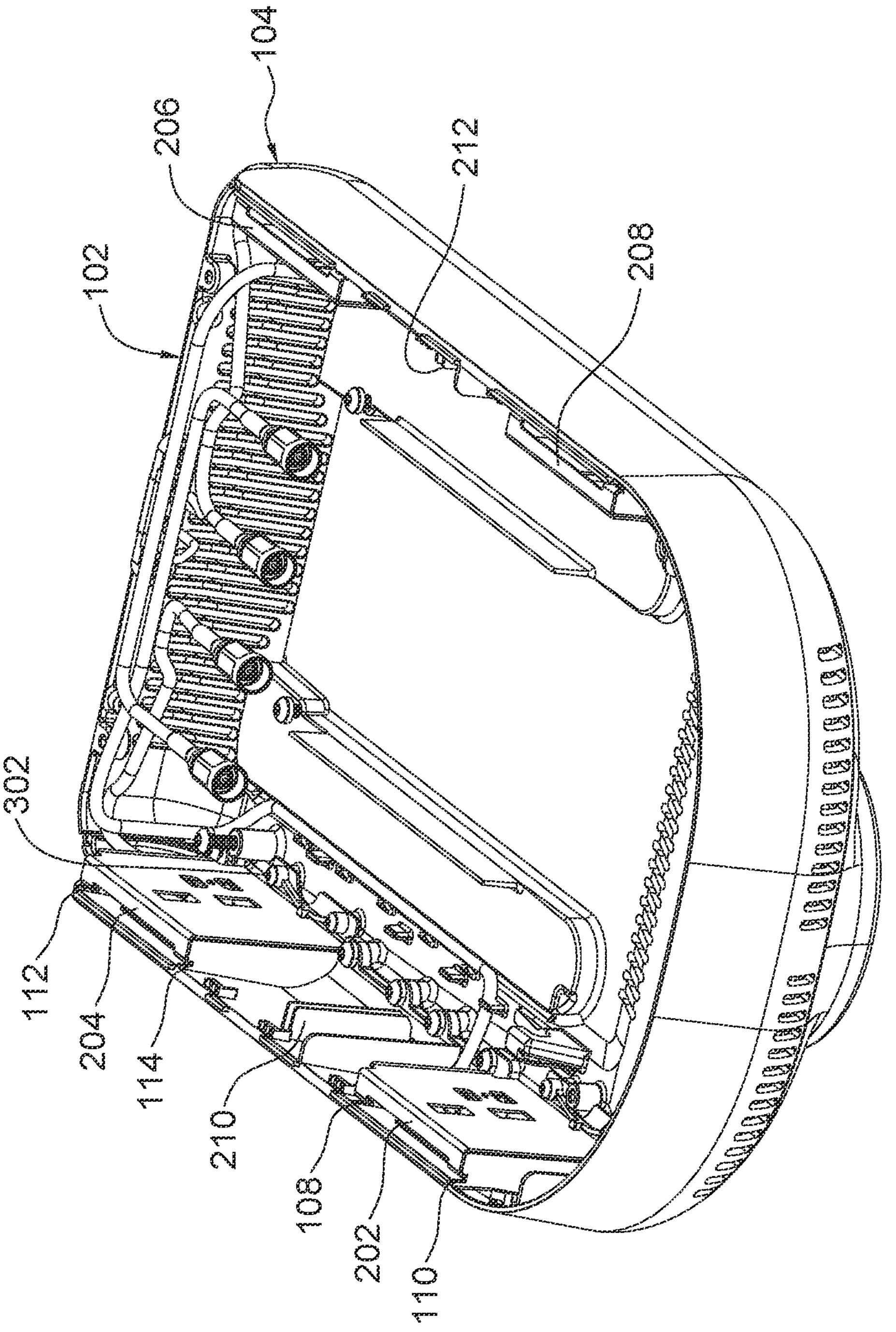
FIG. 3 shows an exploded perspective view of a partial housing assembly of a small cell access node including antenna assemblies assembled in the housing, in accordance with some embodiments.

FIG. 3 shows an exploded perspective view of a partial housing assembly of a small cell access node including antenna assemblies assembled in the housing, in accordance with some embodiments. Specifically, as shown here, antenna bracket 202 is shown fastened to the lower housing member 102 and retained on rib walls 108, 110. Likewise, antenna support bracket 204 is shown retained rib walls 112, 114, and antenna support brackets 204, 208 are likewise shown assembled to respective walls of the sidewall housing member 104. Conductive rib walls 210, 212 are shown disposed between antenna support brackets 202, 204 and 206, 208, respectively.

Figure 4:
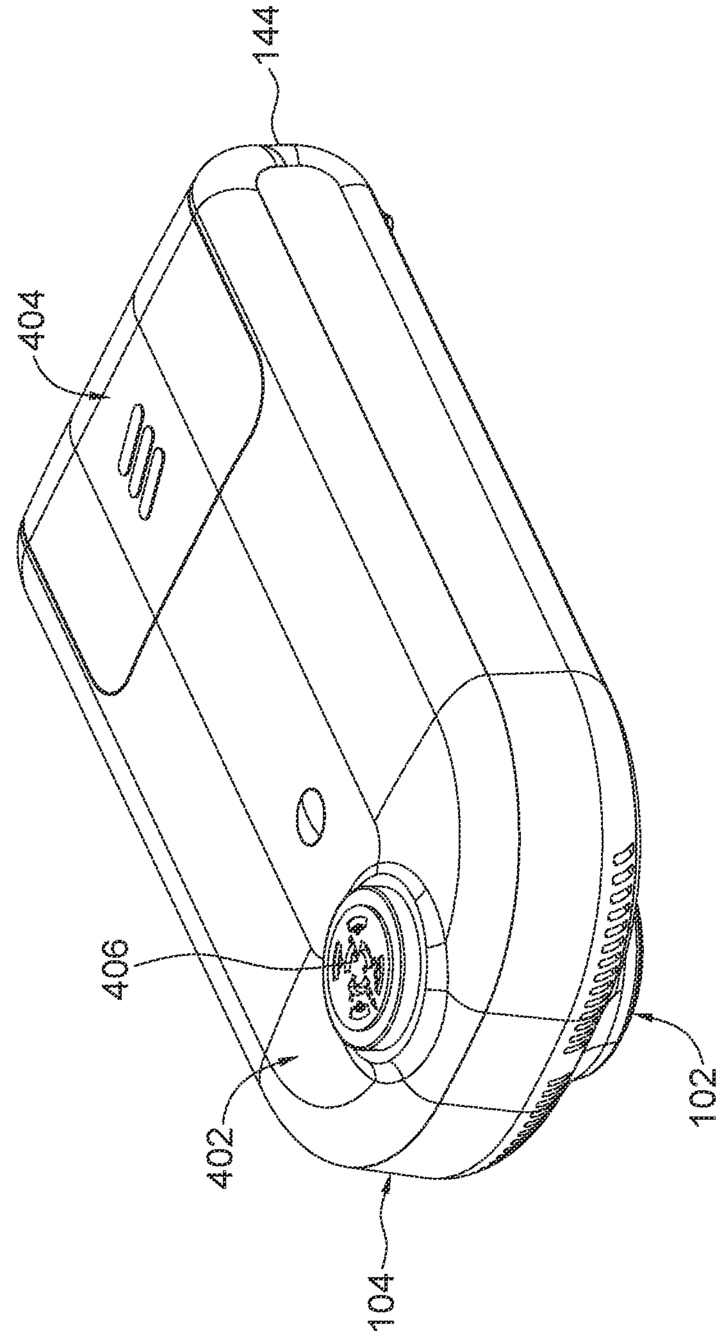
FIG. 4 shows a perspective view of an assembled small cell access node, in accordance with some embodiments.

FIG. 4 shows a perspective view of an assembled small cell access node, in accordance with some embodiments. In addition to the lower housing member 102 and the sidewall housing member 104 there is shown a cover housing member 402 disposed over the sidewall housing member 104, covering the entire area bounded by the sidewall housing member 104 and the back wall 144 of the lower housing member 102. The cover 402 can be made of electrically insulative material, such as polymeric material, and have a major portion that is fastened or otherwise coupled to sidewall housing member 104 and a sliding door 404 at the rear of the assembly. The sliding door 404 can slide between an open and closed position in a substantially horizontal direction parallel to the major portion of the cover 402, and in the open position a rear of the sliding door 404 can be lifted or the sliding door 404 can be entirely removed from the cover 402 to allow access to the interior of the apparatus. Further, the cover 402 can have an opening through which the electrical connector 406 is accessible. Thus, as shown the antenna assemblies including the antenna support brackets and antenna substrate elements are housed within the housing assembly. Since the sidewall housing member 104 is an electrically insulative material radio signals can pass through it, therefore signals can be transmitted and received through the sidewall housing member 104 by each of the antenna assemblies.

Figure 5:
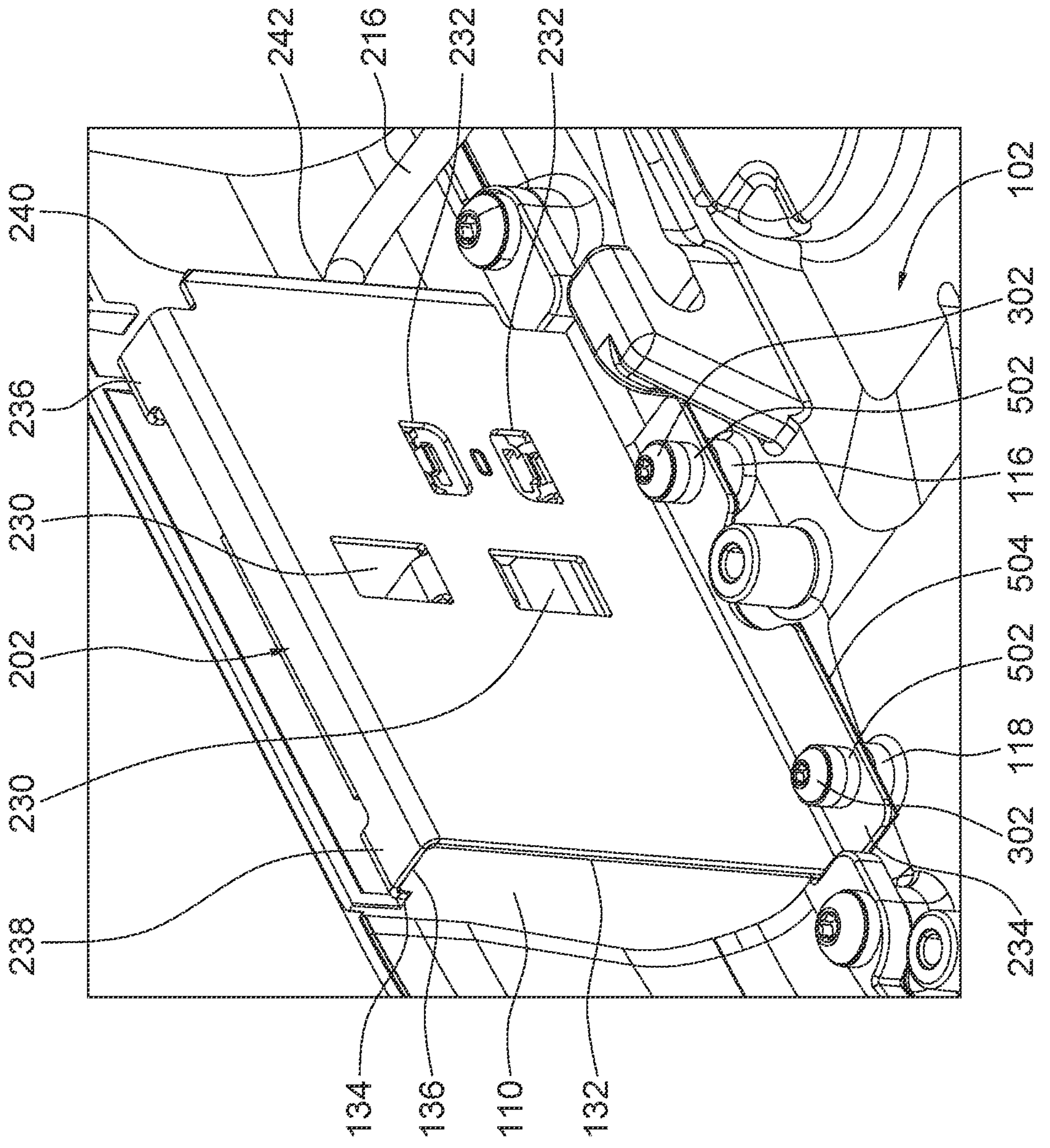
FIG. 5 shows a rear perspective view of an antenna assembly for a small cell access node, in accordance with some embodiments.

FIG. 5 shows a rear perspective view of an antenna assembly for a small cell access node, in accordance with some embodiments. The antenna assembly includes the antenna support bracket 202 shown mounted inside the housing assembly of a small cell access node. While antenna support bracket 202 is specifically shown here, the arrangement and structure will be substantially similar on the other antenna support brackets 204, 206, 208, if present in the apparatus. The antenna support bracket 202 includes a planar body section which, as shown here, is oriented substantially vertically in the housing assembly, and is positioned proximate to a portion of the sidewall housing member 104, spanning a length along the sidewall housing member 104 between rib walls 110 and 108 (which is obscured in this view by the antenna support bracket). At the top of the antenna support bracket 202 is a flange member along the top edge which extends from the top edge of the planar base section or base member in the first direction, generally at a 90° angle to the planar base section. At the opposing sides of the flange member are generally hook-shaped arm members 236, 238 which engage hook receiving elements integrated into or attached to the sidewall such as at the top of the rib walls 108, 110 or other predetermined locations along the sidewall housing member. Specifically, the hook-shaped arm members 236, 238 each form an inverted U shape and the top of the rib walls 108, 110 have a complementary shape that fit within the U shape of the hook-shaped arm members 236, 238. The sides of the planar body section can of the antenna support bracket 202 can be disposed against the outer or inward facing edge 132 of the rib walls 108, 110.

Figure 7:
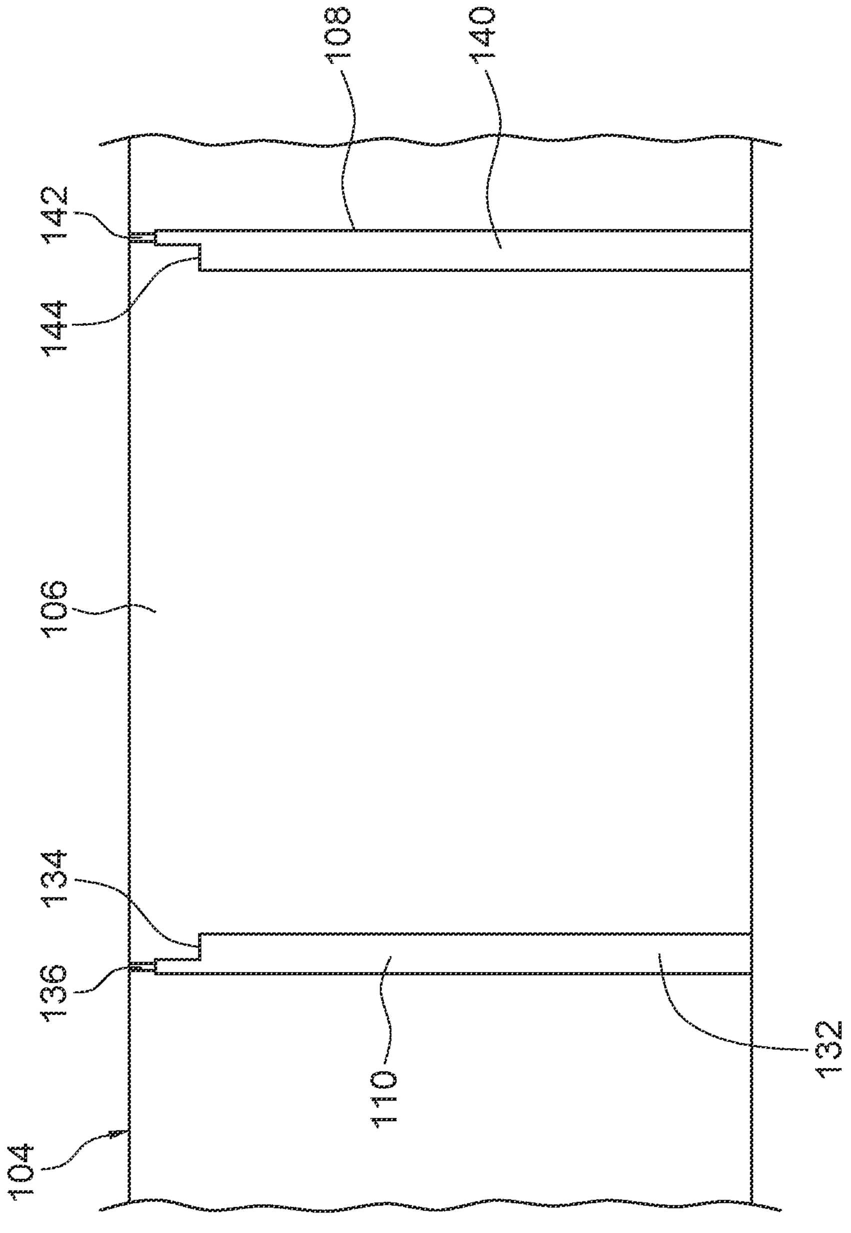
FIG. 7 shows a side view of an antenna assembly bay in a sidewall housing member of a small cell access node, in accordance with some embodiments.
Figure 8:
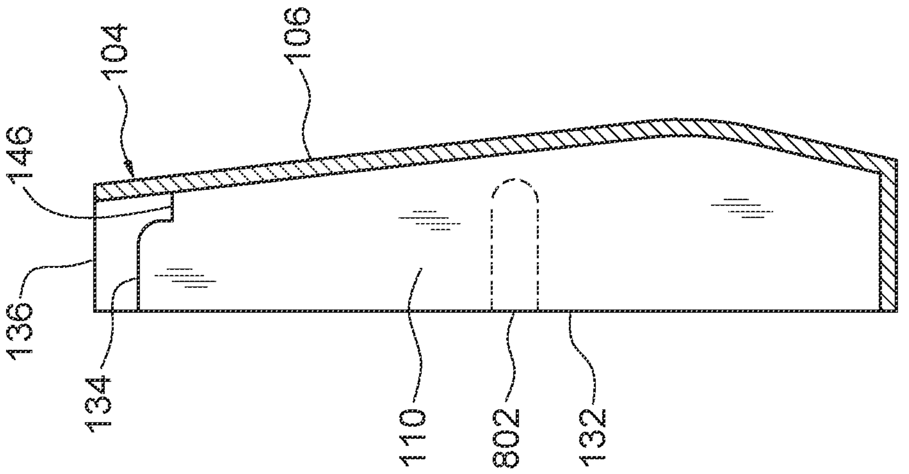
FIG. 8 shows a side view of a retention wall of an antenna bay of a sidewall housing member of a small cell access node, in accordance with some embodiments.

FIG. 7 shows a side elevational view of rib wall 108, 110 as would be seen from within the housing assembly looking towards the inside of the sidewall member 104. As shown in FIG. 7, at the top of each of the rib walls 108, 110 are the hook receiving features 144, 134, respectively. The hook receiving features 144, 134 fit under the hook-shaped arm members 236, 238 and are positioned such that when the antenna support bracket is fastened into place, the hook-shaped arm members interfere with the hook receiving features in the horizontal direction. A vertical extension 142, 136 can extend upward from the rib wall to capture the sides of the hook-shaped arm members 236, 238. The planar body section of the antenna support bracket 202 can rest against the outer edges 132, 140 of the rib walls 110, 108, and distance between the outer sides of the rib walls 108, 110 can be about the same as the width of the planar body section. FIG. 8 shows a side view of rib wall 110 of the sidewall housing member 104, cutting through the wall 106 and looking along the wall 106. The hoot receiving feature 134 includes pocket 146 in which the turned down distal edge of the hook-shaped arm member 238 fits when the antenna support bracket is installed. Rib wall 108 is formed similarly, with the exception that a cutout portion represented by region 802, defined by a broken line here, is removed in order to allow the antenna cable to pass through the rib wall 108.

A second, bottom flange member 234 is formed at a bottom of the planar base section and extends along the bottom and away from the planar base section in a second direction opposite the direction of the top flange member. The bottom flange member 234 has a thickness that is substantially the same as that of the planar body section and had one or more fastener openings through it to allow fastening of the antenna support bracket 202 to the lower housing member 102. For example, threaded fasteners 302 can pass through the bottom flange member 234 into the screw receiving bosses 116, 118. However, while the antenna support bracket 202 is made of an electrically conductive material (e.g., copper, steel, aluminum), it is direct current (DC) isolated from the conductive lower housing member 102, such as by using insulating spacers. For example, insulating spacers such as washers 502 can be placed on the shank of the threaded fasteners 302 which prevent contact between the threaded fasteners 302 and the antenna support bracket 202 at the top of the lower flange member 234. Because the threaded fasteners 302 can be made of metal and therefore electrically conductive, and they are threaded into the lower housing member 102, which is also electrically conductive, the non-conductive spacers/washers are used to maintain electrical isolation between the antenna support brackets and the lower housing member. A similar insulating washer can be placed on the threaded fasteners 302 under the lower flange member 234, and between the lower flange member 234 and the screw receiving bosses 116, 118. Alternatively, an insulating spacer 504 can be applied to the bottom of the lower flange member 234, which substantially covers the bottom the lower flange member 234 and provides electrical isolation between the antenna support bracket and the lower housing member. The threaded fastener can pass through a corresponding opening in the lower flange member 234 and into the screw receiving boss in the floor portion of the lower housing member. Accordingly, the antenna support bracket 202 will be DC-isolated from the lower housing member 102, although since the insulating spacers used are dielectric material, there can be some AC coupling between the antenna support bracket 202 and the lower housing member 102.

Figure 9:
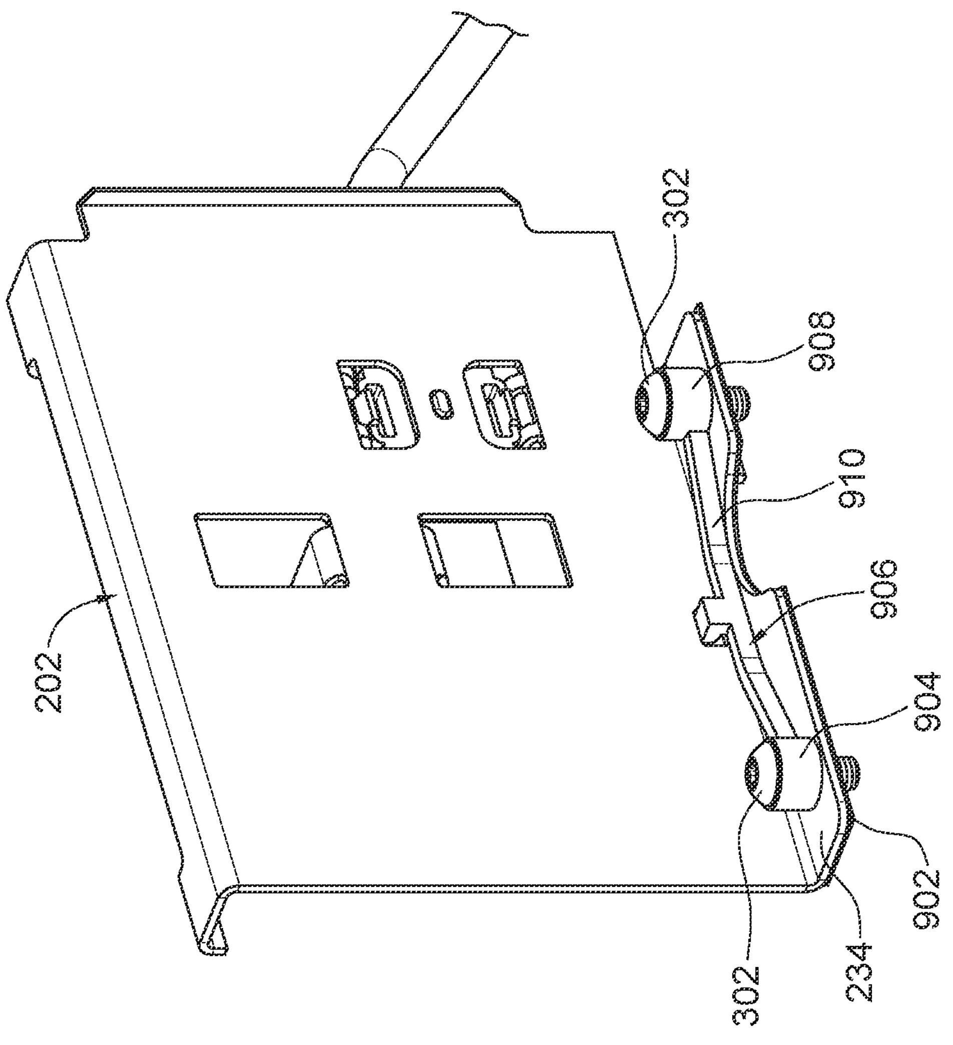
FIG. 9 shows an antenna assembly using a unitary non-conductive spacer, in accordance with some embodiments.
Figure 10:
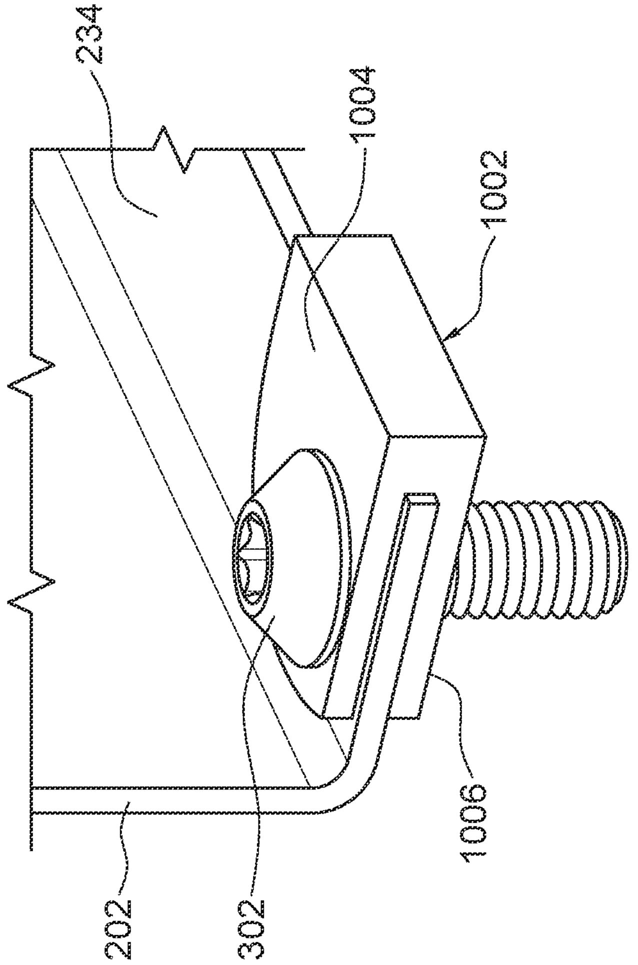
FIG. 10 shows an antenna assembly using a non-conductive clip spacer, in accordance with some embodiments.

FIGS. 9 and 10 show alternative insulating spacer arrangements. In FIG. 9, a unitary or one-piece spacer 906 includes two spacer sections 904, 908 at opposite ends of a central bar 910. Each of the spacer sections has a hole through it that is sized to allow the threaded fasteners 302 pass through the spacer sections 904, 908 and then through the lower flange member 234. The spacer section 904, 910 are made of an electrical insulating material. Underneath the lower flange member 234 can be an insulator layer 902 that is substantially similar to insulating spacer 504. FIG. 10 shows a side perspective cut-away view of a threaded fastener 302 passing through a one-piece spacer clip 1002 having a top portion 1004 and a bottom portion 1006, defining a slot between the top portion 1004 and the bottom portion 1006. A portion of the lower flange member 234 fits between the top portion 1004 and the bottom portion 1006 over an opening through the lower flange member 234. Both the top portion 1004 and bottom portion 1006 have openings through them to allow the threaded fastener to pass through both the top and bottom portions 1004, 1006 and into a screw receiving boss in the lower housing member 102.

The planar body of the antenna support bracket 202 can have openings 230 formed by U-shaped cuts through the planar body to produce tabs that are bent outward in order to mount an antenna substrate on the tabs. Similarly, openings 232 can be formed to mount a cable strain relief clip on the outward-facing side of the planar body (opposite the side shown here). At the rearward side edge 240 of the planar body section, the side edge 240 can be rolled over or turned to present a radiused corner 242 against which the antenna cable 216 may bear against. The radiused corner 242 prevents a sharp edge from being in contact with the antenna cable 216, which can, over time, wear through the outer material of the cable 216 and degrade its signal performance. The term "radiused corner" here means that the vertical edge is turned or bent to present a rounded corner that extends vertically along the side of the planar body section. The radius of the corner can vary as the purpose of forming the radiused corner 242 is to avoid a sharp edge/corner being in contact with the antenna cable.

Figure 14:
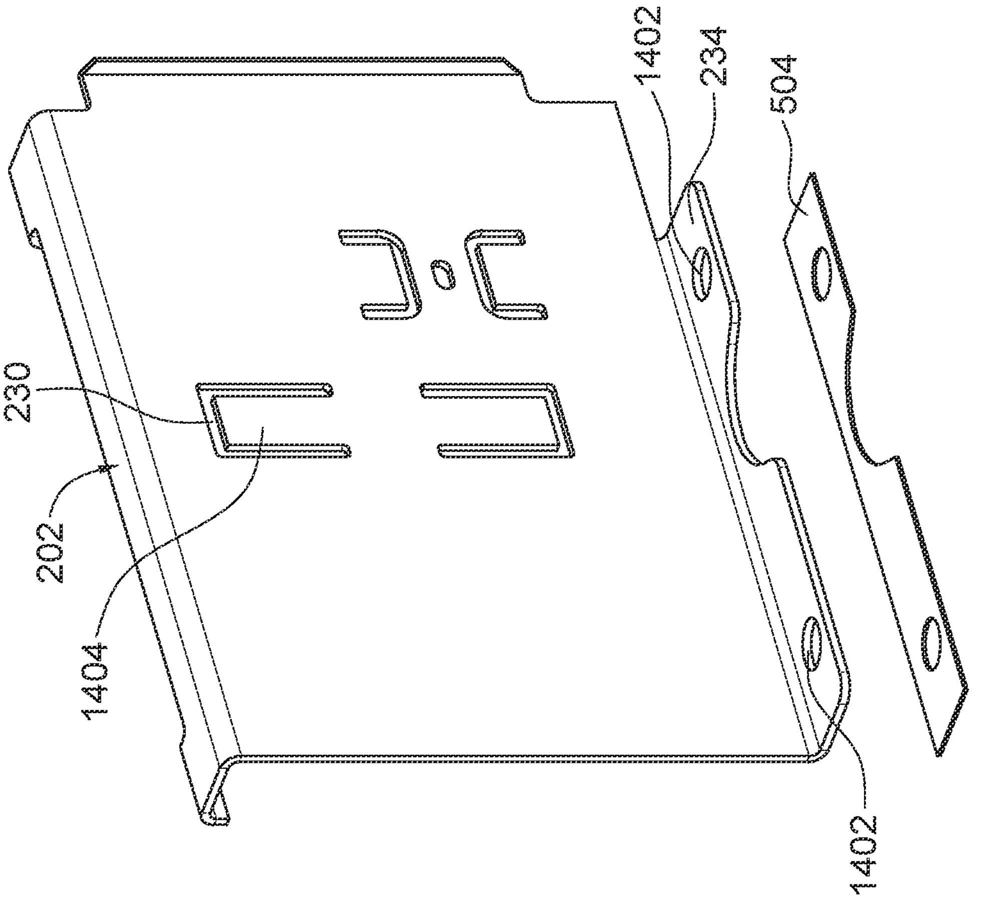
FIG. 14 shows a rear perspective view of an antenna support bracket, in accordance with some embodiments.

FIG. 14 shows the antenna support bracket 202 without the threaded fasteners 302 or non-conductive spacers 502 present, and with the tabs formed by U-shaped cuts to create openings 230 in their position prior to being bent outward. In this view the apertures or openings 1402 can be seen. The openings 1402 through the lower flange member 234 are sized to allow the threaded fasteners 302 to pass to secure the antenna support bracket 202 at the lower flange 234 to the floor portion of the lower housing member. Under the lower flange member 234 is the non-conductive spacer 504 that can be adhered to the lower surface of the lower flange member 234 to, along with non-conductive washers 502, electrically isolate the antenna support bracket 202 from the lower housing member. The U-shaped cuts 1404 form tabs that can be bent outwards to support the antenna substrate and antenna cable retaining clip, as shown, for example, in FIG. 11.

Figure 6:
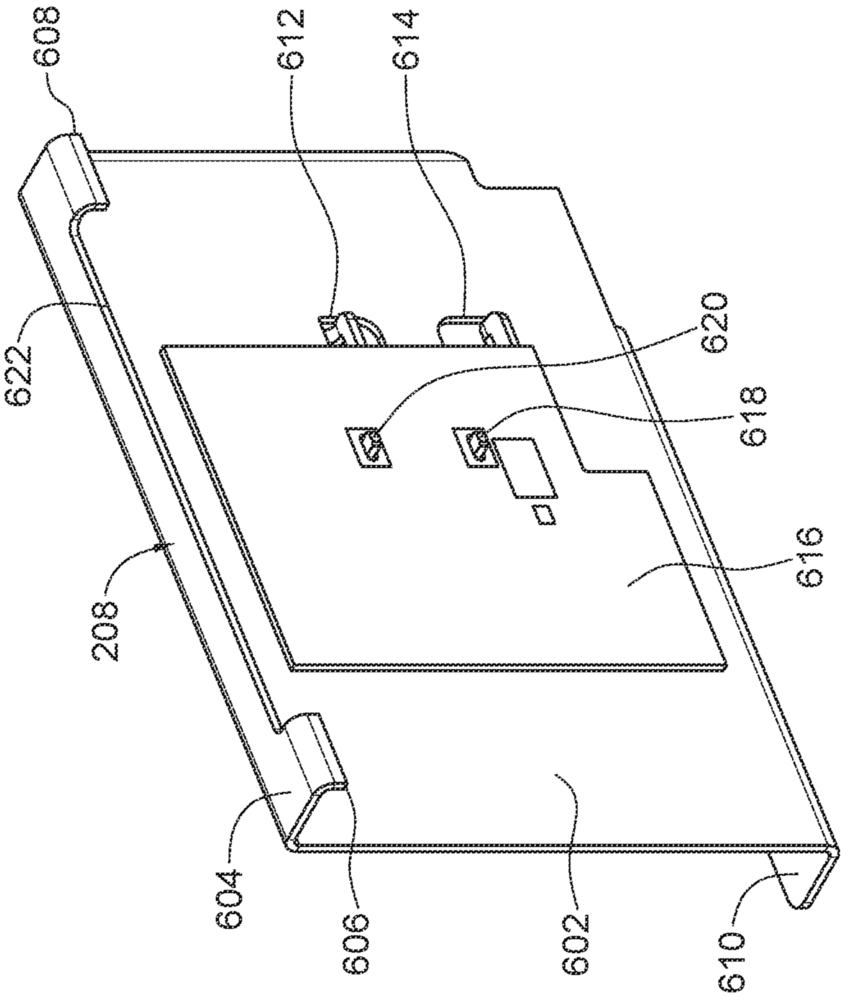
FIG. 6 shows a front perspective view of an antenna assembly for a small cell access node with the housing elements removed, in accordance with some embodiments.
Figure 11:
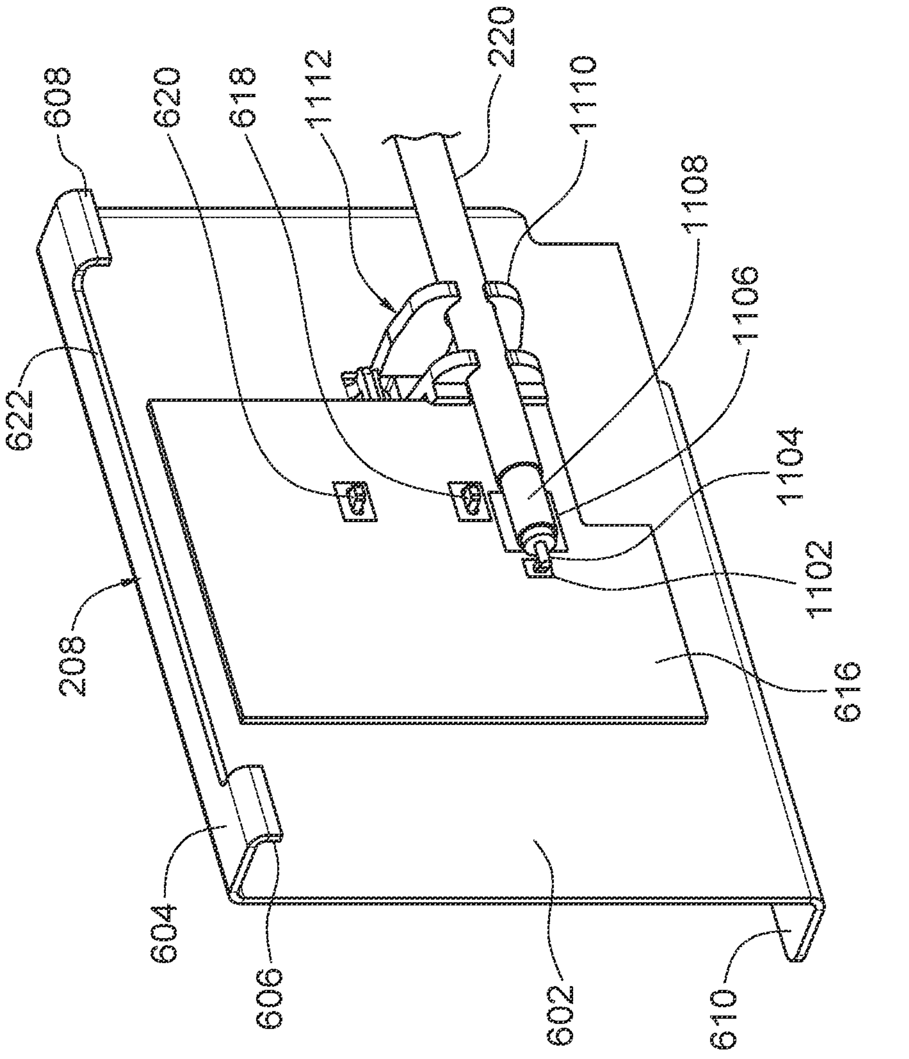
FIG. 11 shows a front perspective view of an antenna assembly for a small cell access node with the housing elements removed, showing a strain relief clip of holding an antenna cable, in accordance with some embodiments.

FIG. 6 shows a front perspective view of an antenna assembly for a small cell access node with the housing elements removed, in accordance with some embodiments. The antenna assembly shows antenna support bracket 208 in an opposite orientation from that of antenna support bracket 202 in FIG. 5. FIG. 11 likewise shows antenna support bracket 208 including the antenna cable retaining clip 1112 and antenna cable 220. Antenna support bracket 208 includes a top flange member 604 that extends away from the plane of a planar body member or section 602 at a first edge of the planar body section 602, specifically at the top edge of the planar body section 602. The top flange 604 forms two hook-shaped arm members 606, 608 at the sides of the top flange member 604. The "sides" referred to here are the left and right sides of the antenna support bracket 208 when the antenna support bracket 208 is oriented as shown. The form the hook-shaped arm members the distal end or edge (relative to the planar body section 604) can be turned down such that each hook-shaped arm member 606, 608 have an inverted U shape. As shown here, the two hook-shaped arm members 606, 608 are distinct due to a cutout 622 of the top flange member 604. Without the cutout 622 then the entire distal edge of the top flange member 604 would be a hook-shaped arm member.

Figure 13:
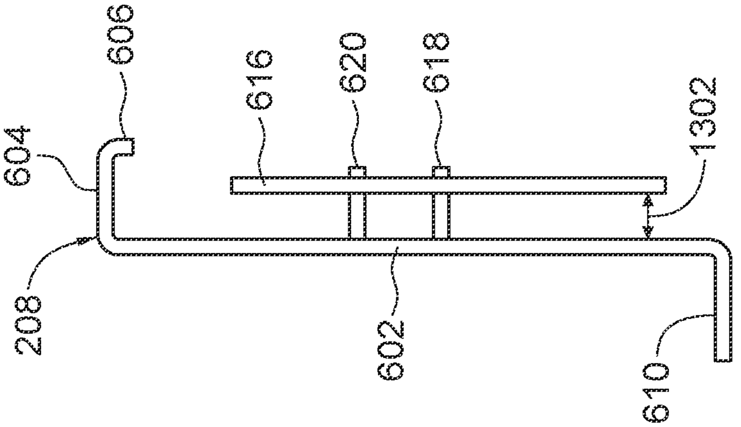
FIG. 13 shows a side view of an antenna assembly including an antenna support bracket, in accordance with some embodiments.

The antenna support bracket 208 (and the other antenna support brackets) are designed to hold an antenna element 616, which includes a dielectric substrate on which there are one or more conductive layers in an arrangement similar to that of a printed circuit board. A layer of conductor material (e.g., copper) is configured into a particular shape for the frequency range being used. The antenna element 616 is held by tabs which extend from the planar body member 602, which can be formed by cutouts resulting in openings 230 in the planar body section 602 as shown in FIG. 5. The tabs can fit into corresponding openings 618, 620 through the antenna element and are electrically isolated from any of conductor of the antenna element 616. Further, the tabs hold the antenna element 616 so that there is space between the back major surface (the front major surface being in view here) of the antenna element 616 and the front side of the planar body section 602 of the antenna support bracket 208, as is shown in FIG. 13, for example, where a side view of the antenna assembly of FIG. 6 is shown. Briefly, in FIG. 13, a gap, indicted by arrow 1302, is shown between the antenna element 616 and the planar body section 602 of the antenna support bracket 208. Tabs 618, 620 extend from the planar body section 602 (creating openings 230) to extend through openings in the planar antenna substrate 616.

Returning to FIG. 6, there is further shown another pair of openings 612, 614 which secure the antenna cable strain relief clip 1112, shown in FIG. 11. In FIG. 11, the antenna cable strain relief clip 1112 is shown attached to the planar body section 602 of the antenna support bracket, and holds the antenna cable 220 with clip arms, such as clip arm 1110, which extends over the antenna cable. The clip arms are arranged on opposite sides of the cable 220 so that the cable 220 can be pushed past the clip arms, deflecting them outwards, and then past the clip arms whereupon the clip arms return to their original position to retain the cable 220. The antenna cable 220 is a coaxial cable having an outer ground conductor and an inner signal conductor. An end portion 1104 of the signal conductor can be soldered to a feed pad 1102 of the antenna element 616, and a portion 1108 of the ground conductor can be soldered to a ground pad 1106 of the antenna element 616. Thus, the antenna support bracket 208 hold the antenna element 616 in a vertical orientation (when the apparatus is levelled). The use of multiple antenna assemblies allows a multiple input and multiple output (MIMO) arrangement. Thus, the various antenna elements on the antenna substrates can be tuned to different frequency bands. Either a 2×2 or 4×4 MIMO configuration can be used.

The planar body section 602 can have a surface area of about 50 to 100 square centimeters, and may be rectangular or square, and slightly larger than the antenna substrate. The planar body section 602, being electrically conductive, provides a shield function to reduce coupling of transmitted signals back into the components of the apparatus. This is important because any metal-to-metal mechanical interface, such as mounting of metal/shielded components (e.g., a radio module) to the conductive floor of the lower housing member can generate passive intermodulation product signals, which can couple into the receiving antennas. Although the intermodulation signals are relatively small compared to the transmitted signals, the receiver circuitry is designed for small, low-level signals, and the intermodulation products can interfere with performance of the receiver circuitry.

Figure 12:
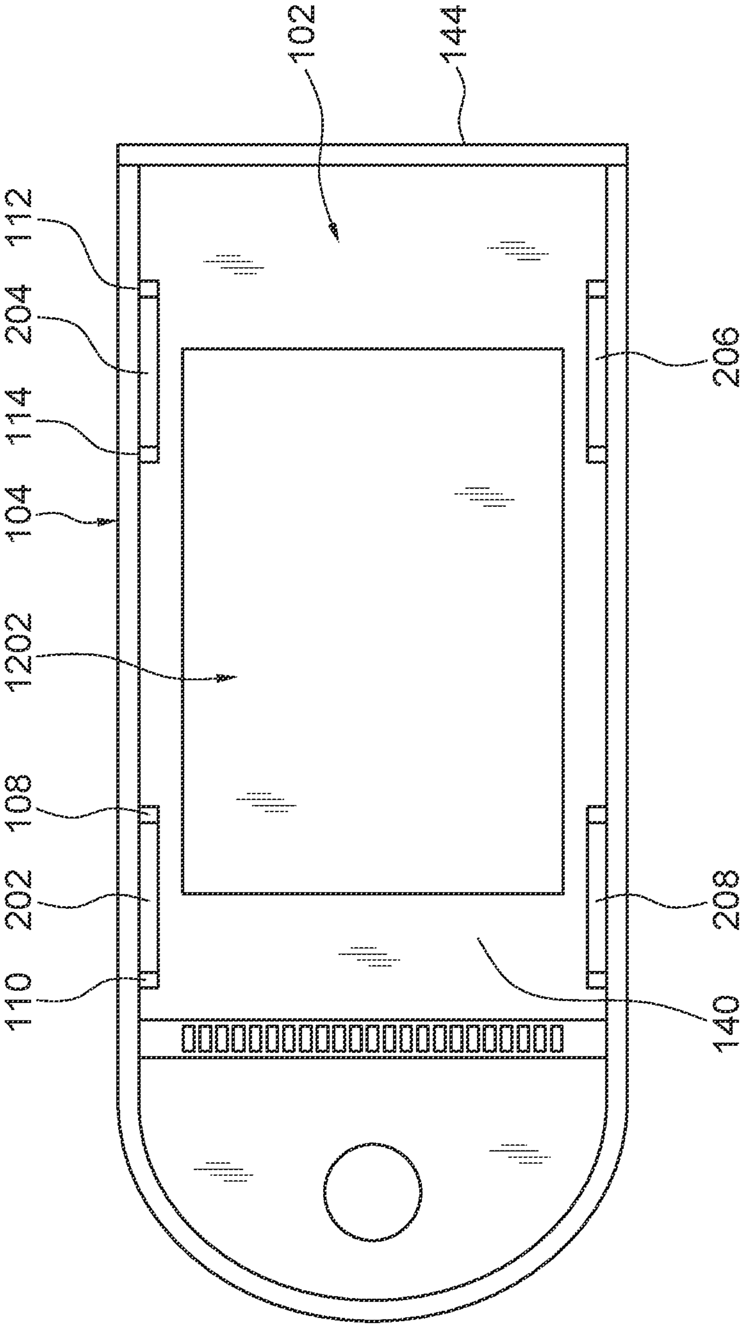
FIG. 12 shows a top plan view of a partial housing assembly of a small cell access node, in accordance with some embodiments.

FIG. 12 shows and overhead plan view of a partially assembled housing assembly for an apparatus such as a small cell access node, without the cover. The lower housing member 102 includes a floor portion 140, and a back wall 144. The sidewall housing member 104 sits on the lower housing member around the periphery of the lower housing member, defining an internal chamber in a volume therein. Inside the volume there is a radio module 1202 that is positioned over the floor 140 and mounted to the floor, with a separation between the bottom of the radio module 1202 and the floor 140 to allow airflow under the radio module 1202. The antenna assemblies, including antenna support brackets 202, 204, 206, 208 are shown installed between the wall 106 of the sidewall housing member 104 and the radio module 1202. Antenna cables 215, 216, 218, 220, which are not shown here, connect the antenna assemblies to different connectors on the radio module in order to transmit and receive radio signals via the antenna assemblies.

A small cell access node has been disclosed having a novel antenna assembly to address the problems associated with relatively having a relatively high-power transmitting element proximate to a receiving element within a compact package. The antenna support brackets hold the antenna elements at a desired orientation while also reducing the coupling of transmitted signals into the componentry of the small cell access node, mitigating the effects of intermodulation products on the receiving of signals while signals are being transmitted.

The claims appended hereto are meant to cover all modifications and changes within the scope and spirit of the present invention.

What is claimed is:

1. An antenna support bracket mountable within a housing of a small cell access node, the antenna support bracket comprising:

a substantially planar base member sized and shaped to support a substantially planar substrate of an antenna; and a flange member positioned along a first edge of the base member and extending away from the base member in a first direction, the flange member including at least one generally hook-shaped arm member configured to engage a hook receiving element integrated with or attached to a sidewall of the small cell access node housing.

2. The antenna support bracket of claim 1, wherein the base member has a surface area in a range of about 50 square centimeters to 100 square centimeters on a surface of the base member that supports the antenna substrate.

3. The antenna support bracket of claim 1, further comprising:

a strain relief clip secured to the base member and configured to receive and provide strain relief to at least part of a coaxial cable, which is soldered to solder pads on the antenna substrate and extends past a second edge of the base member when the antenna substrate is installed on the base member.

4. The antenna support bracket of claim 1, further comprising:

a second flange member positioned along a second edge of the base member and extending away from the base member in a second direction that is generally opposite to the first direction.

5. The antenna support bracket of claim 4, wherein the second flange member has a first surface and an opposing second surface separated by a thickness, the antenna support bracket further comprising:

a non-conductive spacer adhered to the second surface of the second flange member, the spacer providing electrical isolation for the second flange member.

6. The antenna support bracket of claim 5, wherein the second flange member defines an aperture sized and shaped to receive an electrically conductive fastener, the antenna support bracket further comprising:

a second non-conductive spacer adhered to the first surface of the second flange member about the aperture, the second spacer providing electrical isolation between the electrically conductive fastener and the first surface of the second flange member.

7. The antenna support bracket of claim 4, wherein the second flange member defines an aperture sized and shaped to receive an electrically conductive fastener, the antenna support bracket further comprising:

a non-conductive spacer adhered to the first surface of the second flange member about the aperture, the spacer providing electrical isolation between the electrically conductive fastener and the first surface of the second flange member.

8. The antenna support bracket of claim 4, wherein the second flange member has a first surface and an opposing second surface separated by a thickness and wherein the second flange member defines an aperture sized and shaped to receive an electrically conductive fastener, the antenna support bracket further comprising:

a one-piece, non-conductive spacer clip that includes a first spacer element positioned on at least part of the second surface of the second flange member, a second spacer element positioned on the first surface of the second flange member proximate the aperture, and a third spacer element that interconnects the first spacer element and the second spacer element and passes through the aperture, the spacer clip providing electrical isolation between the second flange member and the fastener and between the second flange member and a floor member of the small cell access node housing when the antenna support bracket is installed in the small cell access node housing.

9. The antenna support bracket of claim 1, wherein the flange member includes a pair of spaced apart, generally hook-shaped arm members configured to engage a pair of spaced apart hook receiving elements integrated with or attached to the sidewall of the small cell access node housing.

10. A small cell access node comprising:

a housing including:

an electrically conductive floor member;

an electrically non-conductive sidewall member secured to the floor member about at least part of a periphery of the floor member; and a cover member secured to the sidewall member, the cover member, the sidewall member and the floor member defining an internal chamber of the housing;

at least one hook receiving element attached to or integrated with the sidewall member of the housing and extending toward the internal chamber of the housing;

an electrically conductive antenna support bracket including:

a substantially planar base member sized and shaped to support a substantially planar substrate of an antenna;

a first flange member positioned along a first edge of the base member and extending in a first direction toward the sidewall member of the housing, the first flange member including at least one generally hook-shaped arm member that engages the at least one hook receiving element; and a second flange member positioned along a second edge of the base member and extending away from the base member in a second direction that is generally opposite to the first direction, the second flange member defining at least one aperture;

a first electrically non-conductive spacer positioned between a first surface of the second flange member of the antenna support bracket and the floor member of the housing;

at least a second electrically non-conductive spacer positioned on a second surface of the second flange member of the antenna support bracket proximate the at least one aperture; and at least one electrically conductive fastener passing through the at least one aperture of the second flange member of the antenna support bracket but contacting only the at least a second spacer and the floor member of the housing, the at least one fastener securing the second flange member of the antenna support bracket to the floor member of the housing while maintaining electrical isolation of the second flange member from the at least one fastener and the floor member of the housing.

11. The small cell access node of claim 10, further comprising:

an antenna assembly that includes:

the substantially planar substrate of the antenna; and a coaxial cable soldered to one or more solder pads on the substrate, wherein the substrate is positioned against the base member of the antenna support bracket and the coaxial cable extends past a third edge of the base member of the antenna support bracket.

12. The small cell access node of claim 11, wherein the antenna support bracket further includes:

a strain relief clip secured to the base member and configured to receive and provide strain relief to at least part of the coaxial cable of the antenna assembly.

13. The small cell access node of claim 10, wherein each spacer of the at least a second spacer defines a respective spacer aperture and wherein each fastener of the at least one fastener passes through a spacer aperture and a corresponding aperture of the second flange member of the antenna support bracket.

14. The small cell access node of claim 10, wherein the first spacer and the at least a second spacer are combined into a one-piece spacer clip.

15. The small cell access node of claim 10, wherein the at least one hook receiving element includes a pair of spaced apart hook receiving elements and the first flange member of the antenna support bracket includes a pair of spaced apart, generally hook-shaped arm members that engage the pair of hook receiving elements.

16. A small cell access node comprising:

a housing including:

an electrically conductive floor member;

an electrically non-conductive sidewall member secured to the floor member about at least part of a periphery of the floor member; and a cover member secured to the sidewall member, the cover member, the sidewall member and the floor member defining an internal chamber of the housing;

a plurality of hook receiving elements attached to or integrated with the sidewall member of the housing and extending toward the internal chamber of the housing, the plurality of hook receiving elements being positioned at predetermined locations along the sidewall member of the housing;

a plurality of electrically conductive antenna support brackets, each antenna support bracket including:

a substantially planar base member sized and shaped to support a substantially planar substrate of an antenna;

a first flange member positioned along a first edge of the base member and extending in a first direction toward the sidewall member of the housing, the first flange member including at least one generally hook-shaped arm member that engages at least one respective hook receiving element of the plurality of hook receiving elements; and a second flange member positioned along a second edge of the base member and extending away from the base member in a second direction that is generally opposite to the first direction, the second flange member defining at least one aperture;

a first plurality of electrically non-conductive spacers, each spacer of the first plurality of spacers being positioned between a first surface of the second flange member of a respective antenna support bracket and the floor member of the housing;

a second plurality of electrically non-conductive spacers, each spacer of the second plurality of spacers being positioned on a second surface of the second flange member of a respective antenna support bracket proximate the at least one aperture of the second flange member; and a plurality of electrically conductive fasteners, each fastener of the plurality of fasteners passing through an aperture in the second flange member of an associated antenna support bracket but contacting only a spacer of the second plurality of spacers positioned proximate the aperture and the floor member of the housing, each fastener of the plurality of fasteners securing the second flange member of the associated antenna support bracket to the floor member of the housing while maintaining electrical isolation of the second flange member from the fastener and the floor member of the housing.

17. The small cell access node of claim 16, further comprising:

a plurality of antenna assemblies, wherein each antenna assembly includes:

an antenna substrate; and a coaxial cable soldered to one or more solder pads on the antenna substrate, wherein the antenna substrate of an antenna assembly of the plurality of antenna assemblies is positioned upon the base member of an antenna support bracket of the plurality of antenna support brackets and the coaxial cable of the antenna assembly extends past a third edge of the base member of the antenna support bracket.

18. The small cell access node of claim 17, wherein each antenna support bracket of the plurality of antenna support brackets further includes:

a strain relief clip secured to the base member of the antenna support bracket and configured to receive and provide strain relief to at least part of the coaxial cable of an antenna assembly for which the base member provides support to the antenna substrate of the antenna assembly.

19. The small cell access node of claim 17, wherein the plurality of antenna support brackets are arranged within the housing such that a plurality of antenna substrates supported thereby permit operation of 2×2 multiple input multiple output wireless technology.

20. The small cell access node of claim 17, wherein the plurality of antenna support brackets are arranged within the housing such that a plurality of antenna substrates supported thereby permit operation of 4×4 multiple input multiple output wireless technology.

* * * * *